United States Patent [19]
Nakamura et al.

[11] Patent Number: 5,924,721
[45] Date of Patent: Jul. 20, 1999

[54] SIDE IMPACT AIR BAG SYSTEM

[75] Inventors: Junichi Nakamura, Anjo; Tsutomu Ookochi, Okazaki; Noritaka Nagayama, Okazaki; Mikiharu Shimoda, Okazaki; Akira Yoshioka, Chiryu, all of Japan

[73] Assignee: Mitsubishi Jidosha Kogyo Kabushiki Kaisha, Tokyo, Japan

[21] Appl. No.: 08/833,648

[22] Filed: Apr. 8, 1997

[30] Foreign Application Priority Data

Apr. 8, 1996 [JP] Japan .................................. 8-085178

[51] Int. Cl.⁶ .................................................. B60R 21/22
[52] U.S. Cl. .......................................................... 280/730.2
[58] Field of Search .................................. 280/729, 730.2

[56] References Cited

U.S. PATENT DOCUMENTS

| | | | |
|---|---|---|---|
| 5,464,250 | 11/1995 | Sato . | |
| 5,524,924 | 6/1996 | Steffens, Jr. et al. | 280/730.2 |
| 5,586,782 | 12/1996 | Zimmerman, II et al. | 280/730.2 |

FOREIGN PATENT DOCUMENTS

| | | |
|---|---|---|
| 3744999C2 | 4/1988 | Germany . |
| 4101287A1 | 7/1992 | Germany . |
| 9211421U1 | 3/1993 | Germany . |
| 4430412C1 | 10/1995 | Germany . |
| 450052 | 2/1992 | Japan . |
| 4356246 | 12/1992 | Japan . |

*Primary Examiner*—Kenneth R. Rice

[57] ABSTRACT

In a side impact air bag system having a bag comprising a main body, an upper inflation unit, and a lower inflation unit, the boundaries of the main body and the upper inflation unit and the lower inflation unit are joined and temporally sewn by sewn portions. The main body is inflated without having the upper and lower units inflated until the blowing gas from an inflator into the bag reaches a pressure above a predetermined pressure, and when the pressure inside the bag reaches the pressure above the predetermined pressure, the sewn portions are separated therefrom to flow gas into the upper and lower inflation units to deploy the upper and lower inflation units. Thus, the bag is positively inflated in a narrow space between a passenger and a vehicle without excessively increasing impact against a chest portion of the passenger.

21 Claims, 10 Drawing Sheets

(a)

(b)

SIDE IMPACT AIR BAG SYSTEM

FIELD OF THE INVENTION

This invention relates to a side impact air bag for protecting a passenger (or a driver) in a vehicle when a shock is applied externally to the side of the vehicle.

PRIOR ART

When a shock is applied externally to the side of the vehicle by a side impact or the like, the vehicle door or the vehicle components are deformed by a collision force depending on a magnitude of the shock. To relax the shock force to the passenger caused by the deformation, there have been proposed various air bags which are inflated between the side of the vehicle and the passenger when the side impact occurs, so that the shock force applied to the passenger is absorbed by the air bag to protect the passenger(for example, Japanese Patent Laid-Open 4-50052, Japanese Patent Laid-Open 4-56246 and the like).

A heretofore proposed side impact air bag has a bag folded up together with a gas generating device, both installed inside a vehicle seat (mainly in the seat back) to maintain a relative position of the side impact air bag with respect to the passenger constant, and is provided with detection means for detecting the side impact to blow the gas into the bag from the gas generating device. When the side impact is detected by detecting means, gas is instantaneously blown out from the gas generating device into the bag so that the bag is inflated between the side of the vehicle and the passenger. With the bag disposed between the side of the vehicle and the passenger in the vehicle, the shock applied to the passenger caused by the deformed door and the like is absorbed by the bag to protect the passenger.

In the conventional side impact air bag system, the bag inflates in a direction substantially perpendicular to an input of side impact when the side impact occurs, therefore, the air bag is required to be instantly inflated with a high pressure in order to positively inflate the bag in a narrow space between the vehicle and the passenger. However, when the bag is inflated, a portion of the bag opposing the chest portion and a portion of the bag opposing the abdomen portion are inflated with substantially the same pressure. This makes the impact against the chest portion relatively greater, and there exits a possibility that a desired absorption of impact can not be achieved.

SUMMARY OF THE INVENTION

In a view of the above-mentioned problems, an object of the present invention is to provide a side impact air bag system capable of positively inflating the bag in a narrow space between a vehicle and a passenger without increasing the impact against the chest portion of the passenger.

To achieve the above object, there is provided a side impact air bag system having a bag inflating between a side of a vehicle and a passenger by a gas blown out from a gas generating device, wherein the bag comprises: a first portion facing an abdomen portion of the passenger when inflated; a second portion facing a chest portion of the passenger when inflated, the second portion being contained within the first portion prior to the inflation of the bag, and deployed from the first portion when the bag is inflated; and gas flow adjusting means for allowing flow of the gas from the first portion into the second portion when the pressure of the gas blowing into the first portion reaches a predetermined pressure.

In the side impact air bag system, the first portion includes; an inflation portion being contained within the first portion prior to the inflation of the bag and deployed in a downward direction when the bag is inflated; and second gas flow adjusting means for allowing flow of the gas from the first portion into the inflating portion when the pressure of the gas blowing into the first portion reaches the predetermined pressure.

In the side impact air bag system, the gas flow adjusting means includes a releasably joined boundary between the first portion and the second portion which is separated when the pressure of the gas in the first portion reaches the predetermined pressure.

In the side impact air bag system, the boundary is joined by sewing.

In the side impact air bag system, the boundary is joined by an adhesive.

In the side impact air bag system, the boundary is joined by detachable fastener means.

Further, in the side impact air bag system, the gas flow adjusting means includes a film member provided in the first portion, and the film member being formed to be separated therefrom when the pressure of the gas in the first portion reaches the predetermined pressure.

Further, in the side impact air bag system, the gas flow adjusting means includes an inner bag having a shape corresponding to the first portion, said inner bag being disposed in the first portion and formed to rupture when the pressure of the gas in the first portion reaches the predetermined pressure.

Still further, in the side impact air bag system, the second gas flow adjusting means includes a releasably joined boundary of the first portion and the inflation portion which is separated when the pressure of the gas in the first portion reaches the predetermined pressure.

Yet further, in the side impact air bag system, the second gas flow adjusting means includes an inner bag having a shape corresponding to the first portion, said inner bag being disposed in the first portion and formed to rupture when the pressure of the gas in the first portion reaches the predetermined pressure.

Yet further, in the side impact air bag system, the second gas flow adjusting means includes a film member provided in the first portion, and the film member being formed to be separated therefrom when the pressure of the gas in the first portion reaches the predetermined pressure.

Yet further, in the side impact air bag system, the gas flow adjusting means and the second gas adjusting means are disposed within the first portion, both adjusting means having shapes corresponding to the first portion and combined into a single inner bag which ruptures when the pressure of the gas in the first portion reaches the predetermined pressure.

DESCRIPTION OF THE PREFERED EMBODIMENTS

Figure 1:
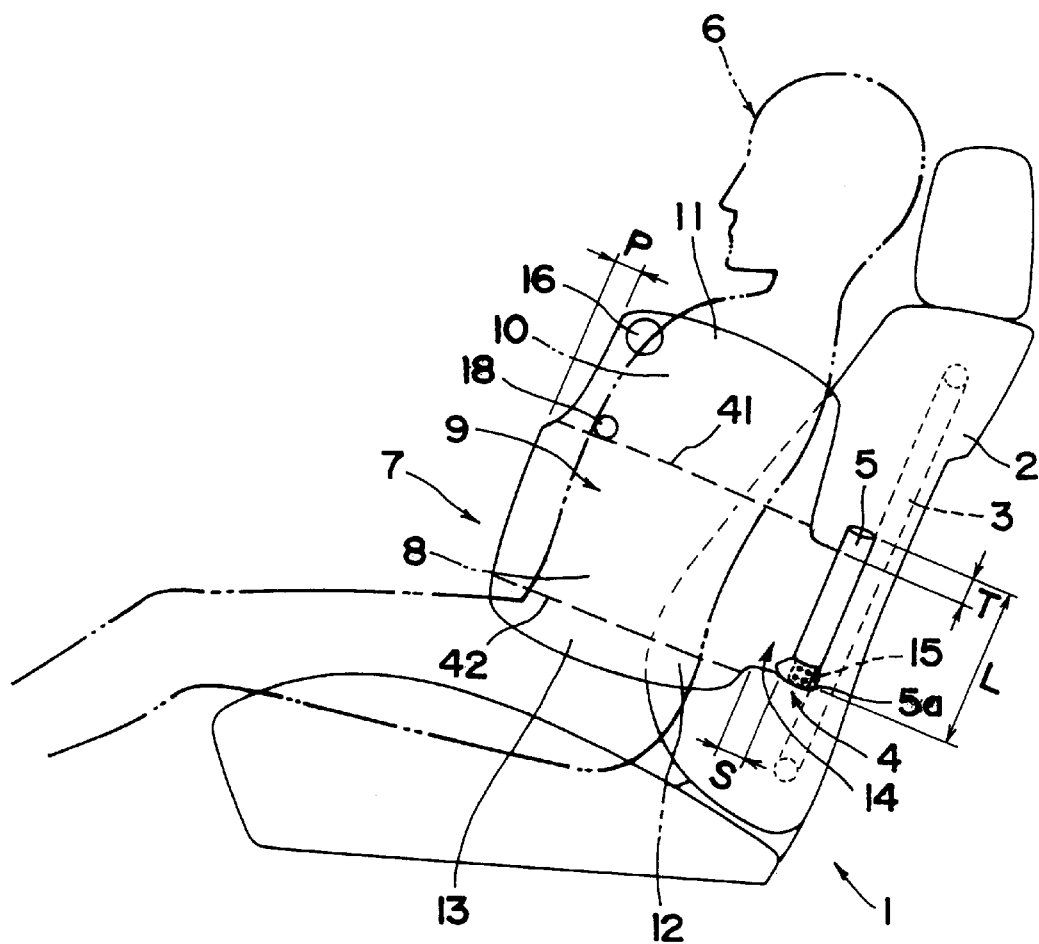
FIG. 1 is a side view showing a side impact air bag system according to an embodiment of the present invention.
Figure 2:
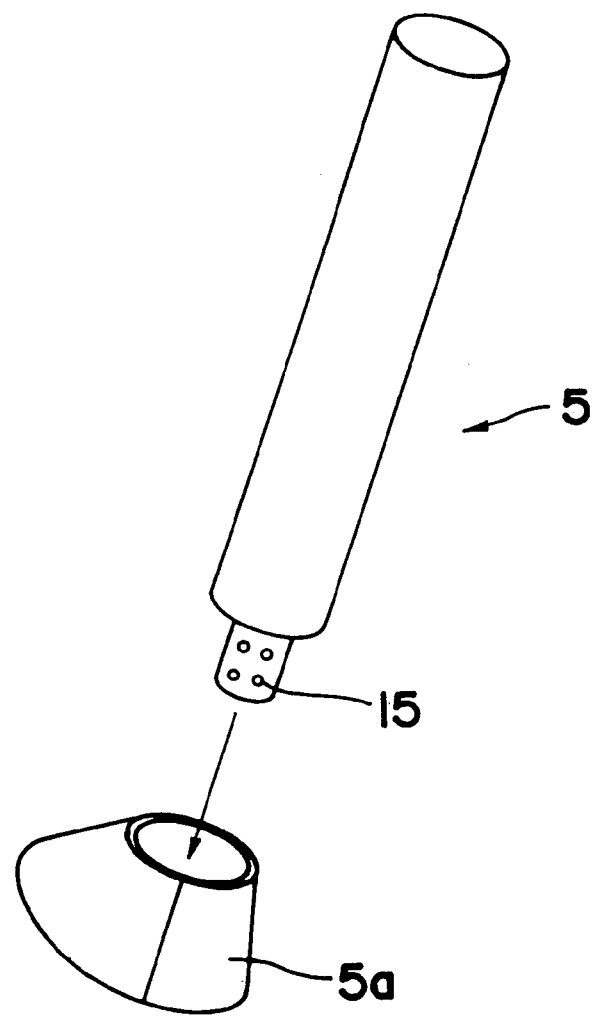
FIG. 2 is an exploded perspective view of an inflator.
Figure 3:
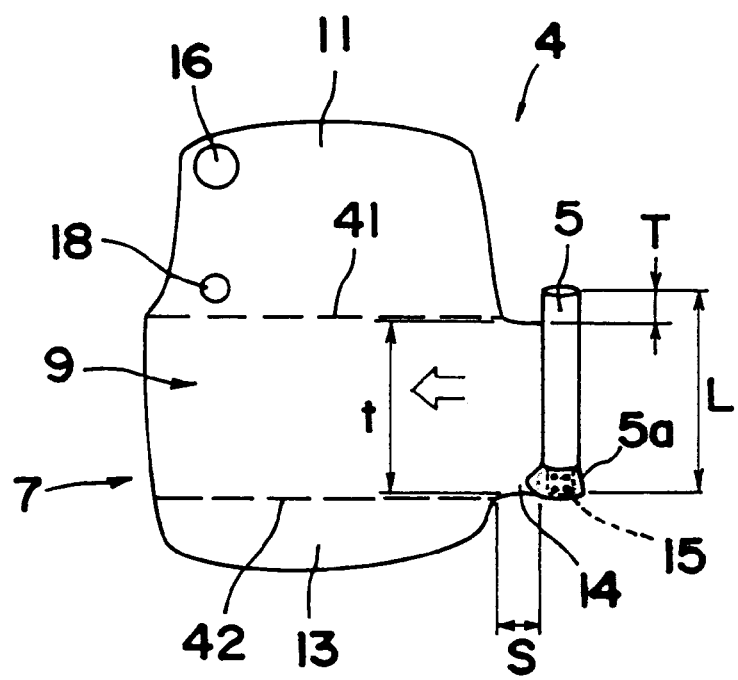
FIG. 3 is a side view of a bag.
Figure 4:
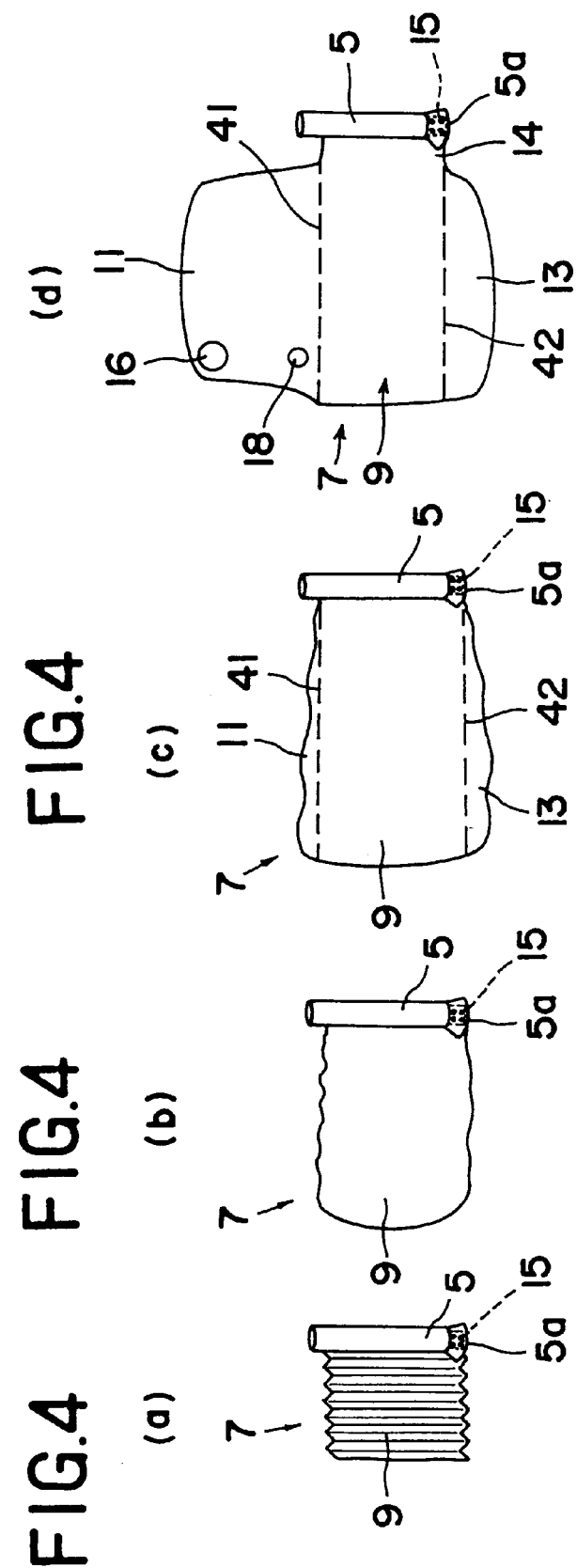
FIGS. 4(a), (b), (c), and (d) are explanatory views showing folding conditions of a bag.
Figure 5:
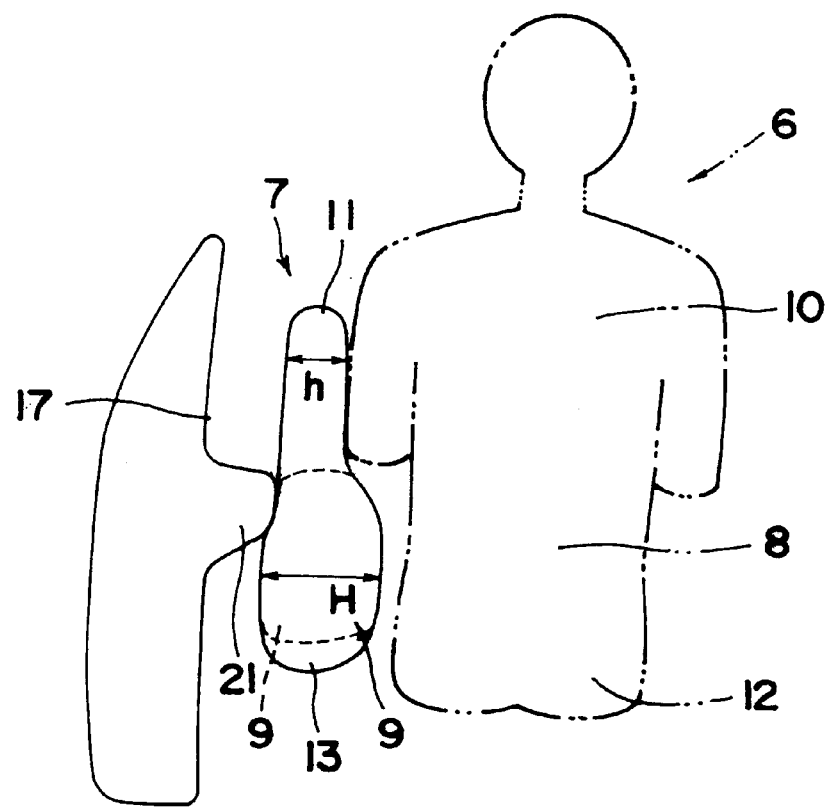
FIG. 5 is a rear view showing the relationship between the side of the vehicle and the passenger when the bag is inflated.
Figure 6:
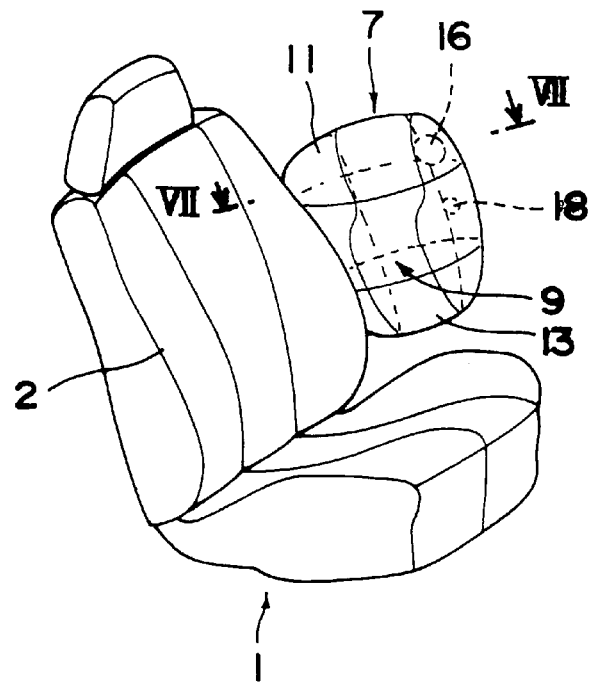
FIG. 6 is a perspective view when the bag is inflated.
Figure 7:
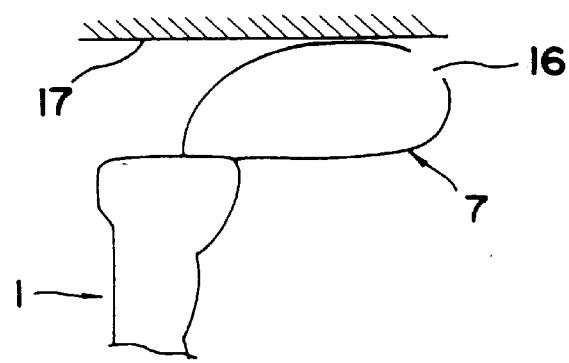
FIG. 7 is a cross sectional view taken along the line VII—VII in FIG. 6.

In the following, embodiments of a structure of a side impact air bag system of the present invention will be described by referring to the accompanying drawings. FIG. 1 shows a side view of a side impact air bag system according to an embodiment of the present invention; FIG. 2 shows an exploded perspective view of an inflator; FIG. 3 shows a side view of the bag; FIG. 4 shows a view of a folded bag; FIG. 5 shows a rear view of the relationship between the side of the vehicle and the passenger when the bag is inflated; FIG. 6 shows a perspective view when the bag is inflated; and FIG. 7 shows a cross sectional view taken along the line VII—VII in FIG. 6.

As shown in FIG. 1, a frame 3 of a seat back 2 of a vehicle seat 1 is provided with a side impact air bag system 4. The side impact air bag system 4 has a bag 7 which is inflated between the side of the vehicle and a passenger 6 by gas blown out from an inflator 5 serving as a gas generating device. The bag 7 comprises: a main body 9 for covering a side of an abdomen portion 8 of the passenger 6 when the bag is inflated; an upper inflation unit 11 as an inflation unit which, when the bag is inflated, is deployed in an upward direction of the main body 9 in order to cover a side of a chest portion 10 (the rib portion) of the passenger 6; and a lower inflation unit 13 which is deployed in a downward direction of the main body 9 in order to cover the lower part of the abdomen portion 8 and a part of a waist portion 12 of the passenger 6. The bag 7 is connected to the inflator 5 by means of a gas intake portion 14 for suppressing diffusion of the gas blown out from the inflator 5.

As shown in FIGS. 1 and 2, the inflator 5 is cylindrically formed and filled with a compressed gas, and blowing ports 15 for blowing the gas are provided at the lower portion of the inflator 5. The blowing ports 15 are disposed at a height substantially equal to the abdomen portion 8 of the passenger 6, and an umbrella-shaped guide member 5a is mounted on the lower portion of the inflator 5 for covering the blowing ports 15 and guiding the blown gas in the downward direction, that is, to the lower inflation unit 13. With the guide member 5a mounted thereon, the gas blown out from the blowing ports 15 are positively guided to the lower inflation unit 13 (lower portion), so that the gas is positively guided to the portion of the bag 7 opposing the abdomen portion 8 of the passenger 6.

Here, the guide member 5a is mounted on the lower portion of the inflator 5 to guide the gas blown out from the blowing ports 15 to the lower inflation unit 13 and to the portion of the bag 7 opposing the abdomen portion 8 of the passenger 6. Alternatively, the guide member 5a can be omitted depending on the position of the blowing ports 15. Still further, the lower inflation unit 13 of the bag 7 can be formed to cover the entire waist portion 12 of the passenger 6.

The upper inflation unit 11 of the bag 7 is provided with a first vent hole 16 serving as internal pressure adjusting means, by which the gas is appropriately discharged from the first vent hole 16 to obtain an appropriate pressure inside of the bag 7 for absorbing the shock when the bag 7 is inflated. As shown in FIGS. 6 and 7, when the bag 7 is inflated, the first vent hole 16 is formed at a position away from the inflator 5 and at the upper portion (upper inflation unit 11) on the side surface opposite to the passenger 6. Further, the first vent hole 16 is formed at a portion where the inflated bag 7 is not brought in contact with a door trim 17 as one of structural members of vehicle compartment, that is, at the tip where the inflated bag 7 is made R-shaped.

In addition, a second vent hole 18 having a smaller diameter than the first vent hole 16 is formed in the upper inflation unit 11 in the vicinity of the boundary of the main body 9 of the bag 7 and the upper inflation unit 11. The second vent hole 18 is also formed at a portion where the inflated bag 7 is not in contact with the door trim 17 as one of structural members of vehicle compartment, that is, at the tip where the inflated bag 7 is made R-shaped.

In the above-described embodiment, the first vent hole 16 is described as an example of pressure adjusting means. However, the pressure adjusting means is not limited to such first vent hole 16, but it is also possible to employ a system which can maintain the pressure of the portion (upper inflated portion 11) of the bag 7 opposing the chest portion 10 of the passenger 6 when the bag 7 is appropriately inflated, that is, at a reduced pressure.

The boundary of the main body 9 of the bag 7 and the upper inflation unit 11 is temporarily sewn and joined by a sewn portion 41, and similarly, the boundary of the main body 9 and the lower inflation unit 13 is temporarily sewn and joined by a sewn portion 42. The sewn portions 41 and 42 are provided to serve as gas flow adjusting means to allow the flow of the gas when the gas pressure reaches a pressure above a predetermined pressure, and these portions are separated when the gas pressure in the main body 9 reaches the pressure above the predetermined pressure. Namely, when the gas is blown out from the inflator 5, the main body 9 is inflated until the sewn portions 41 and 42 are separated from the main body 9. After the sewn portions 41 and 42 are separated therefrom, the upper inflation unit 11 and the lower inflation unit 13 are inflated accordingly. The bag 7 is normally folded in the predetermined condition and contained in the side of the seat bag 2, and the bag 7 is instantly inflated by gas blown out from the inflator 5 when the side impact is detected by detecting means (not shown).

Here, in the above-mentioned embodiment, the boundary of the main body 9 and the upper inflation unit 11 and the boundary the main body 9 and the lower inflation unit 13 are joined, respectively, but it is possible to employ other joining members which can serve as gas flow adjusting means to allow the flow of gas when the gas reaches the pressure above the predetermined pressure.

Figure 8:
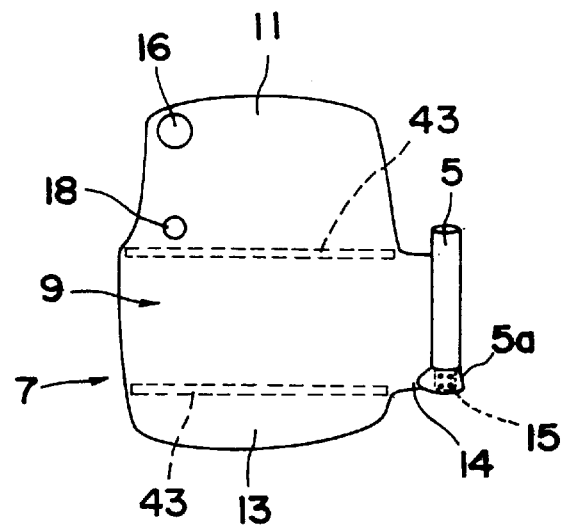
FIG. 8 is a side view of a bag according to another embodiment of the present invention.
Figure 9:
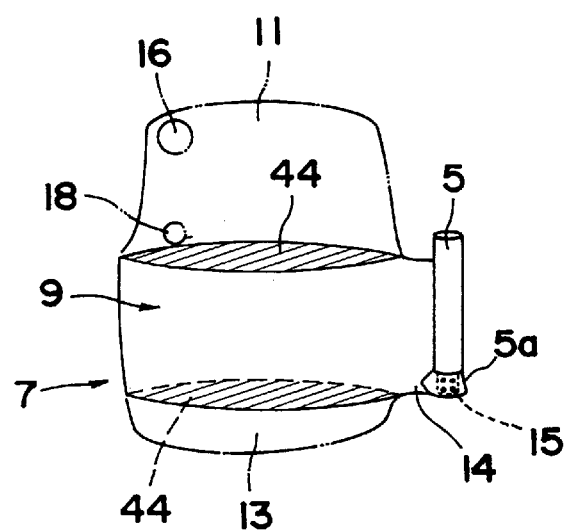
FIG. 9 is a side view of a bag according to another embodiment of the present invention.

As shown in FIG. 8, for example, it is possible to join the boundary of the main body 9 and the upper inflation unit 11 and the boundary of the main body 9 and the lower inflation unit 13 with sheet fasteners (trade name: magic tape) 43 having a predetermined width, respectively. Also, as shown in FIG. 9, the inner surface of the bag 7 of the boundary of the main body 9 and the upper inflation unit 11 and that of the main body 9 and the lower inflation unit 13 can be provided with film members 44 for allowing the gas flow when gas reaches the pressure above the predetermined pressure, in other words, to be separated by the gas above the predetermined pressure. Further, it is possible to join directly the inner surface of the boundaries of the bag 7. Even in a case where the sheet fastener 43 or the film member 44 is employed, the portion of the main body 9 is inflated first followed by inflation of the upper inflation unit 11 and the lower inflation unit 13 when the bag 7 is inflated.

Figure 10:
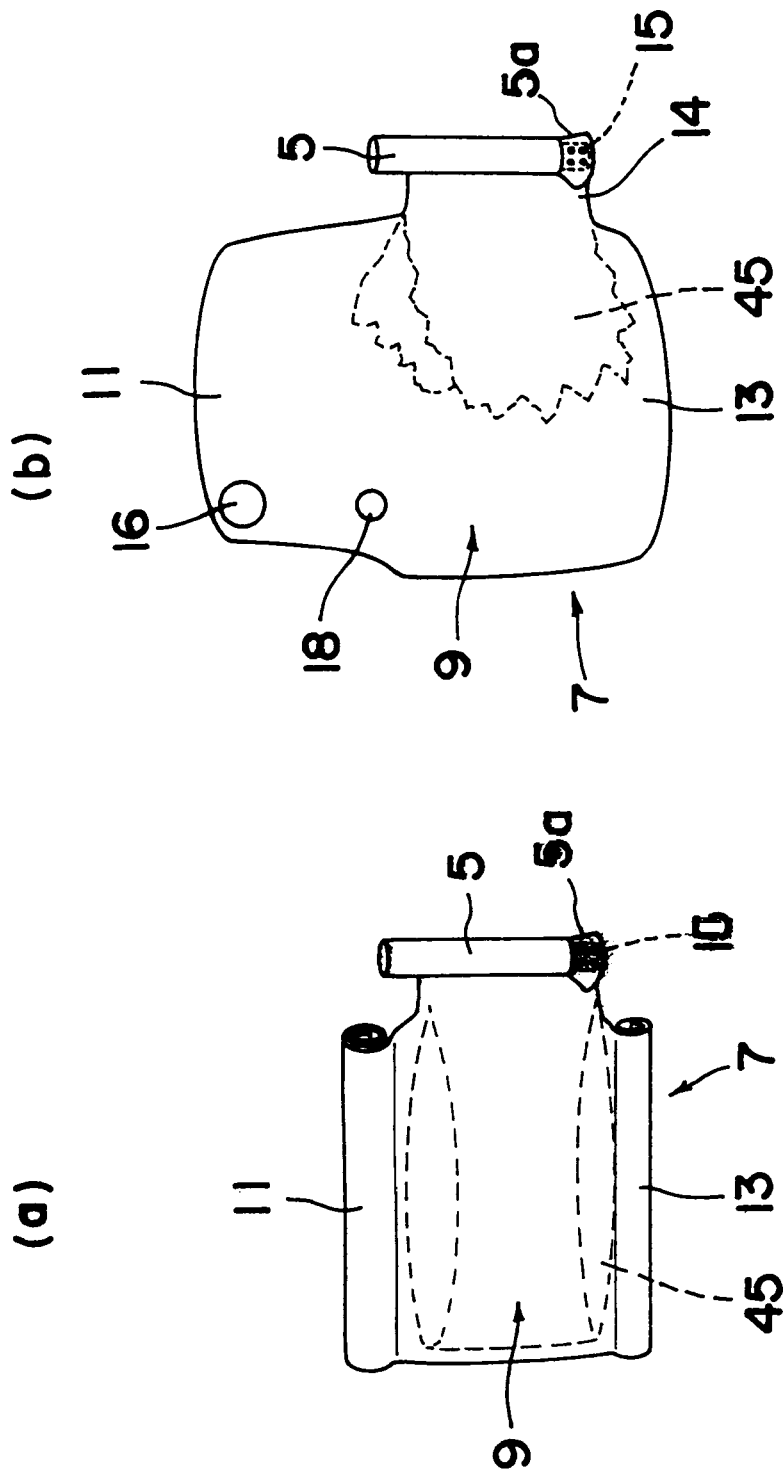
FIGS. 10(a) and (b) are side views of a bag according to another embodiment of the present invention.

The description will proceed to the another example of the gas flow adjusting means for allowing the gas flow when the gas reaches the pressure above the predetermined pressure, by referring to FIG. 10. FIG. 10 shows a side view of the side impact air bag system according to another embodiment; FIG. 10(a) shows a condition when the main body 9 is being inflated; and FIG. 10(b) shows a condition when the bag 7 is fully inflated.

As shown in these figures, the side impact air bag system has an inner bag 45 provided within the bag 7 and having a shape corresponding to the main body 9, and the inner bag 45 has such strength that it ruptures when the inner pressure reaches above the predetermined pressure. Gas from the inflator 5 is blown into the inner bag 45 first, thereby inflating the inner bag 45 and the main body 9 (the condition of FIG. 10(a)), and when the inner bag 45 is inflated up to the predetermined pressure, the inner bag 45 is ruptured to inflate the upper inflation unit 11 and the lower inflation unit 13 (the condition of FIG. 10(b)).

Similar to the aforementioned manner, the inner bag 45 is adapted such that, when the bag 7 is inflated, the portion of main body 9 is inflated until the inner bag 45 ruptures, and, the upper and lower inflation units 11 and 13 are inflated after the inner bag 45 is ruptured.

Next, the gas intake portion 14 will be described. As shown in FIG. 3, the gas intake portion 14 is formed at a position lower by a width T from the top end of the inflator 5 and has a width t at the bottom end of the inflator 5. Further, the gas intake portion 14 extends toward the main body 9 by a predetermined distance S and continues to the bag 7. Namely, the gas intake portion 14 of the bag 7 has a connecting portion connecting the bag 7 to the inflator 5 shorter than the length of the inflator 5. With the gas intake portion 14, the gas from the inflator 5 is blown in the forward direction towards the portion of the main body 9 without diffusion.

Figure 11:
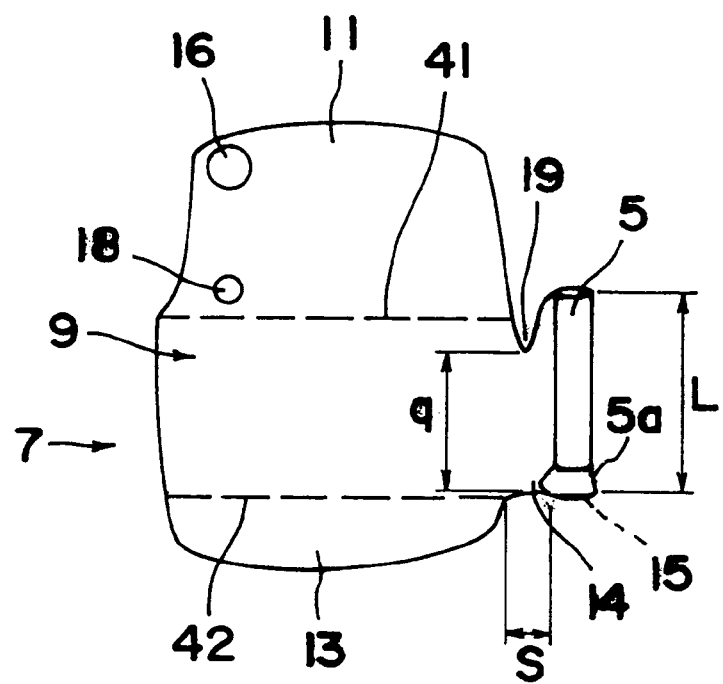
FIG. 11 is a side view of a bag according to another embodiment of the present invention.

Here, the gas intake portion 14 may be formed such that the width t is extended to a length L in the vertical direction of the inflator 5. Also in this case, the gas intake portion 14 extends toward the main body 9 by a predetermined distance s and continues to the bag 7. In addition, as shown in FIG. 11 which shows the side view of the bag 7, a narrowed portion 19 having a width q shorter than the vertical length L of the inflator 5 may be provided so that the gas intake portion 14 is connected to the top and bottom ends of the inflator 5 and extended by the predetermined distance S in a horizontal direction. The position of the narrowed portion 19 can be appropriately set to suppress diffusion of the gas blown out from the inflator 5 and regulate the blowing of the gas to a selected direction.

On the other hand, as shown in FIG. 1, the tip in the longitudinal direction (direction away from the inflator 5) of the upper inflation unit 11 of the bag 7 is made shorter by a length P than the main body 9. The length of the upper inflation unit 11 is shortened as compared with the length of the main body 9 in the direction away from the inflator 5 by shortening the connection of the gas intake portion 11 to the inflator 5 and by cutting the tip of the upper inflation unit 11. As shown in FIG. 5, by shortening the length of the upper inflation unit 11 as compared with the main body 9, a width h of the upper inflation 11 is made narrower than a width H of the main body 9 when the bag 7 is inflated.

As a component for narrowing the width of the upper inflation unit 11, as shown in FIG. 12(a) showing a side view of the bag 7 and in FIG. 12(b) showing a cross sectional view in FIG. 12(a), it is possible to attach both ends of a strap 20 to the inner surface of the upper inflation unit 11. In this case, a length M of the strap 20 is shorter than the width H when the main body 9 is inflated(see FIG. 12(b)), in the upper inflation unit 11, inflation in the width direction is suppressed by the strap 20, and the width h when the upper inflation unit 1 is inflated is narrower than the width H of the main body 9.

In the above-described embodiment, the width of the upper inflation unit 11 when inflated is narrower than the width of the main body 9, however, at least the width of the boundary of the upper inflation unit 11 and the main body 9 may be narrower than the main body.

Description will proceed to an operation of the side impact air bag system 4 having the above-described structure. The aforementioned bag 7 is inflated by the gas blown out from the inflator 5 when a side impact is detected by detecting means (not shown). The gas blown out from the blowing ports 15 are guided by the guide member 5a to the lower portion of the bag 7, and diffusion is suppressed by the gas intake portion 14 so that the bag 7 is blown in the forward direction. As a result, the portion of the main body 9 of the bag 7, which has the upper and portions thereof joined by sewing portions 41 and 42 (portion opposing the abdomen portion 8 of the passenger 6), is momentarily inflated by a high pressure (the conditions from FIGS. 4(a) to (b) and see the dotted line portions in FIGS. 1 and 5), and the main body 9 enters between the passenger 6 and the door trim 17 or the armrest 21.

When the main body 9 enters between the passenger 6 and the door trim 17 or the armrest 21, the abdomen portion 8 having a higher shock load resistance than that of the chest portion 10 is pressed to move the passenger 6 to the opposite side of the door trim 17 or the armrest 21. This presses the passenger 6 in the same direction of the movement of the door trim 17 (armrest 21) into the vehicle compartment when side impact occurs, whereby relaxing the relative velocity with respect to the deformation.

By guiding the gas blown out from the blowing ports 15 of the inflator 5 in the downward direction by the guide member 5a and by suppressing diffusion of the gas by the gas intake portion 14, and by temporally sewing the upper and the lower portions of the main body 9 with the sewn portions 41 and 42, the main body 9 opposing the abdomen portion 8 which has a higher shock load resistance than that of the chest portion 10, that is, the desired portion of the bag can be positively inflated between the passenger 6 and the door trim 17 (armrest 21). Thus the bag 7 is inflated in the narrow space momentarily by a high pressure, whereby relaxing the relative velocity with respect to the movement of the vehicle components in the passenger compartment.

When the gas is continuously blown out from the blowing ports 15 of the inflator 5 into the bag 7, the sewn portions 41 and 42 are separated therefrom when the gas pressure inside of the main body 9 reaches at a pressure above the predetermined pressure (the condition from FIGS. 4(b) to (c)). When the sewn portions 41 and 42 are deployed to fully inflate the bag 7 (see the condition FIG. 4(*d*) and dotted lines in the FIG. 1 and FIG. 5), the upper inflation unit 11 is inflated between the door trim 17 and the chest portion 10 of the passenger 6. In addition, the lower inflation unit 13 is inflated between the door trim 17 and a part of the waist portion 12 of the passenger 6.

At this moment, as shown in FIGS. 6 and 7, the unit 11 having the first vent hole 16 and the second vent hole 18 formed at the tip thereof, becomes R-shape when the bag 7 is inflated. Therefore, the upper inflation unit 11 can be inflated without having the first vent hole 16 and the second vent hole 18 being closed by the door trim 17 or the armrest 21. Consequently, the gas discharged condition can be maintained appropriately to obtain an appropriate pressure of the bag 7.

In the process of inflation of the upper inflation unit 11, the internal volume of the bag 7 is increased in accordance with the inflation of the upper inflation unit 11 from the main body 9, and the gas is discharged from the first vent hole 16 in the predetermined condition, thereby the appropriate pressure to absorb the shock is obtained. Also, in the process of developing the upper inflation unit 11, gas is discharged from the second vent hole 18 in the vicinity of the boundary of the main body 9 and the upper inflation unit 11, in other word, in the vicinity of the portion opposing the lower portion of the chest portion 10 (the lowest rib). Further, when the bag 7 is fully inflated, since the connection of the gas intake portion 14 to the inflator 5 is shortened and the length of the upper inflation unit 11 is shortened compared with the main body 9, as shown in FIG. 5, the width h of the upper inflation unit 11 is made narrower than the width H of the main body 9.

Accordingly, since an appropriate pressure for absorbing the shock is produced between the door trim 17 and the chest portion 10, which is lower in shock load resistance than the abdomen portion 8, and the upper inflation unit 11 having the reduced width inflates, the bag 7 can be inflated without applying a shock to the chest portion so as to absorb the shock force against the movement of the door trim 17 (armrest 21) in the direction of the vehicle compartment. Further, gas is discharged from the vicinity of the boundary of the main body 9 and the upper inflation unit 11, thereby relaxing the shock when the bag starts contacting with the lower portion of the chest portion 10 (the lowermost rib).

Figure 12:
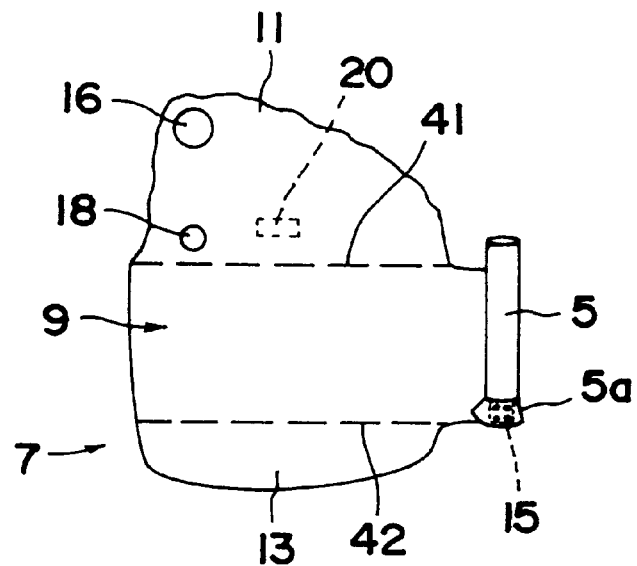
FIGS. 12(a) and (b) are explanatory views showing an embodiment of a bag having a reduced width in the upper inflation unit by a strap.
Figure 12:
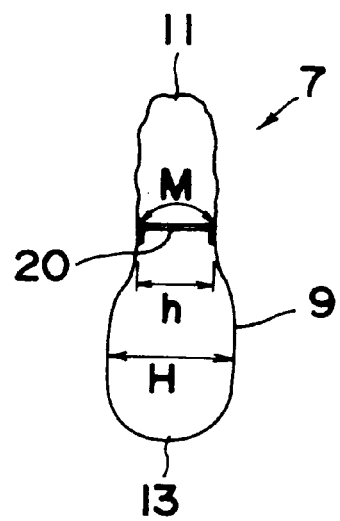

As shown in FIG. 12, even when the width h of the upper inflation unit 11 is made smaller than the width H of the main body 9 by using the strap 20, the bag 7 can be similarly inflated without applying a high shock to the chest portion 10, thereby absorbing the shock force against the deformation of vehicle structural members.

With the above-described side impact air bag system 4, the gas from the inflator 5 is blown out towards the lower portion of the bag 7 and diffusion of the gas is suppressed by the gas intake portion 14. Further, the upper and lower portions of the main body 9 are temporarily sewn by the sewn portions 41 and 42. Accordingly, the bag 7 starts inflating by a high pressure gas from a portion of the main body 9 opposing the abdomen portion 8 which has a higher shock load resistance than the chest portion 10. In other words, the bag 7 inflates from a portion other than the portion opposing the chest portion 10 having lower shock load resistance, thus the bag 7 is brought in contact with the abdomen portion 8 and not in contact with the chest portion 10 during inflation under high pressure. Consequently, the bag 7 is momentarily and positively inflatable in the narrow space between the passenger 6 and the door trim 17 (armrest 22) to press the passenger 6 toward the inside of the compartment, and thereby the relative velocity with respect to the movement of the door trim 17 (armrest 22) towards the vehicle compartment can be relaxed.

After the main body 9 opposing the abdomen portion 8 is inflated, and when inflation of the upper inflation unit 11 from the main body 9 begins, while the gas is being discharged from the vicinity of the boundary of the main body 9 and the upper inflation unit 11 by the second vent hole 18 associated with inflation of the upper inflation unit 11, and the gas is discharged from the first vent hole 16 in the constant condition. Thus, when the upper inflation unit 11 is inflated from the inside of the main body 9, the upper inflation unit 11 having a smaller width than that of the main body 9 is inserted between the door trim 17 and the chest portion 10 with a slightly reduced internal pressure of the upper inflation unit 11. Accordingly, the internal pressure of the upper inflation unit 11 is appropriately adjusted, so that the bag 7 can be inflated without applying a high shock to the chest portion 10 and the shock force due to the movement of the door trim 17 into the vehicle compartment can be absorbed.

Further, since the first vent hole 16 and the second vent hole 18 are provided at the portion where they are not affected by the deformation of the door trim 17, the first vent hole 16 and the second vent hole 18 will not be closed even in a case where the door trim 17 is deformed towards the inside of the vehicle compartment. Consequently, gas discharged while the bag 7 is inflated is not obstructed, thereby always obtaining the desired internal pressure.

As described in the foregoing, with the sewn portions 41 and 42 temporally sewn at the upper and lower portions of the main body 9, it is possible to inflate the bag 7 into a desired condition by regulating the main body 9 to be inflated towards the abdomen portion 8, thereby improving the restraining condition of the passenger 6. In addition, gas blowing direction from the inflator 5 can be regulated by the gas intake portion 14, so that a high pressure gas toward the upper inflation unit 11 opposing the chest portion 10 is prevented from ejecting, thereby improving the restraining condition of the passenger 6.

Further, the internal pressure inside the bag 7 is appropriately adjusted by the first vent hole 16 and the second vent hole 18, and the width of the upper inflation unit 11 is narrowed as compared with the main body 9, thereby the bag 7 can be inflated without applying a high shock to the chest portion 10 of the passenger 6. The first vent hole 16 and the second vent hole 18 are placed at positions which will not be closed by vehicle structure members, thus the desired internal pressure can be always obtained and the restraining condition of the passenger 6 is not decreased. Furthermore, by inflating the upper inflation unit 11 and the lower inflation unit 13 in the vertical direction, the possibility can be eliminated such that the bag is interfered with the door trim 17 or the armrest 21 during inflation.

According to the side impact air bag system of the present invention, the bag is formed of the main body and the inflation units, and the gas flow adjusting means for allowing the flow of the gas when the gas reaches the pressure above the predetermined pressure are provided at the boundaries between the main body and the inflation units. Thus, the main body is inflated first prior to the inflation of the inflation units until the gas inside the bag blown out from the gas supply means reaches the pressure above the predetermined pressure. When the gas inside the bag reaches the pressure above the predetermined pressure, the gas flows into the inflation units to inflate the inflation units. Consequently, the bag can be positively inflated in the narrow space between the vehicle body and passenger without excessively increasing the shock to the chest portion of the passenger.

Further, with the gas flow adjusting means structured by joining and sewing the boundaries between the main body and inflation units, any joining process can be facilitated and also the joining strength can be selectively set by selectively selecting the thickness of a thread, a sewn interval, or a sewn method.

What is claimed is:

1. A side impact air bag system having a bag inflating between a side of a vehicle and a passenger by a gas blown out from a gas generating device, said bag comprising:

a first portion facing an abdomen portion of said passenger when inflated;

a second portion facing a chest portion of said passenger when inflated, said second portion being connected to said first portion;

gas flow adjusting means for allowing flow of the gas from said first portion into said second portion when the pressure of said gas blowing into said first portion reaches a predetermined pressure;

an inflation portion contained within said first portion prior to the inflation of the bag and deployed in a downward direction when the bag is inflated; and second gas glow adjusting means for allowing flow of the gas from said first portion into said inflating portion when the pressure of said gas blowing into said first portion reaches the predetermined pressure.

2. The side impact air bag system of claim 1, wherein said second portion is contained within said first portion prior to the inflation of the bag, and deployed from said first portion when said bag is inflated.

3. A side impact air bag system of claim 2, wherein said gas flow adjusting means includes a releasably joined boundary between said first portion and said second portion which is separated when the pressure of said gas in said first portion reaches the predetermined pressure.

4. A side impact air bag system of claim 3, wherein said boundary is joined by sewing.

5. A side impact air bag system of claim 3, wherein said boundary is joined by an adhesive.

6. A side impact air bag system of claim 3, wherein said boundary is joined detachable fastener means.

7. A side impact air bag system of claim 2, wherein said gas flow adjusting means includes a film member provided in said first portion, said film member being formed to be separated therefrom when the pressure of said gas in said first portion reaches the predetermined pressure.

8. A side impact air bag system of claim 2, wherein said gas flow adjusting means and said second gas adjusting means are disposed within said first portion, both adjusting means having shapes corresponding to said first portion and combined into a single inner bag which ruptures when the pressure of said gas in said first portion reaches the predetermined pressure.

9. A side impact air bag system of claim 2, wherein said second gas flow adjusting means includes a releasably joined boundary between said first portion and said inflation portion which is separated when the pressure of said gas in said first portion reaches the predetermined pressure.

10. A side impact air bag system of claim 9, wherein said boundary is joined by sewing.

11. A side impact air bag system of claim 9, wherein said boundary is joined by an adhesive.

12. A side impact air bag system of claim 9, wherein said boundary is joined by detachable fastener means.

13. A side impact air bag system of claim 2, wherein said second gas flow adjusting means includes an inner bag having a shape corresponding to said first portion, said inner bag being disposed in said first portion and formed to rupture when the pressure of said gas in said first portion reaches the predetermined pressure.

14. A side impact air bag system of claim 2, wherein said second gas flow adjusting means includes a film member provided in said first portion, said film member being formed to be separated therefrom when the pressure of said gas in said first portion reaches the predetermined pressure.

15. A side impact air bag system having a bag that inflates between a side of a vehicle and a passenger by a gas blown out from a gas generating device, said bag comprising:

a first portion facing an abdomen portion of said passenger when inflated;

more than one second portions connected to said first portion and facing areas of said passenger other than said abdomen portion when inflated; and gas flow adjusting means corresponding to each of said second portions for enabling gas flow from said first portion thereto based on whether pressure within said first portion reaches a predetermined threshold.

16. A side impact air bag system, comprising:

an inflator which generates gas; and a bag which includes:

a first portion which protects an abdomen portion of a passenger inside a vehicle when inflated, said first portion being connected to said inflator;

a second portion which protects a chest portion of the passenger when inflated, said second portion begin connected to said first portion;

a gas flow adjusting unit which prohibits flow of gas from said first portion to said second portion until a pressure inside said first portion reaches a predetermined values;

an inflation portion contained within said first portion prior to the inflation of the bag and deployed in a downward direction when the bag is inflated; and second gas flow adjusting means for allowing flow of the gas from said first portion into said inflating portion when the pressure of said gas blowing into said first portion reaches the predetermined pressure.

17. A side impact air bag system of claim 16, wherein said inflator is attached to a seat of the vehicle.

18. A side impact air bag system of claim 16, wherein said gas adjusting unit is disposed inside said bag between said first portion and said second portion.

19. The side impact air bag system of claim 16, wherein said second portion is contained within said first portion prior to the inflation of the bag, and deployed from said first portion when said bag is inflated.

20. A side impact air bag system having a bag inflating between a side of a vehicle and a passenger by a gas blown out from a gas generating device, said bag comprising:

a first portion facing an abdomen portion of said passenger when inflated;

a second portion facing a chest portion of said passenger when inflated, said second portion being connected to said first portion; and gas flow adjusting means for allowing flow of the gas from said first portion into said second portion when the pressure of said gas blowing into said first portion reaches a predetermined pressure, wherein said gas flow adjusting means includes an inner bag having a shape corresponding to said first portion, said inner bag being disposed in said first portion sand formed to rupture when the pressure of said gas in said first portion reaches the predetermined pressure.

21. The side impact air bag system of claim 20, wherein said second portion is contained within said first portion prior to the inflation of the bag, and deployed from said first portion when said bag is inflated.

* * * * *